United States Patent
Shi et al.

(10) Patent No.: US 7,194,736 B2
(45) Date of Patent: Mar. 20, 2007

(54) DYNAMIC DIVISION OPTIMIZATION FOR A JUST-IN-TIME COMPILER

(75) Inventors: Xiaohua Shi, Beijing (CN); Guei-Yuan Lueh, San Jose, CA (US); Zhiwei Ying, Beijing (CN)

(73) Assignee: Intel Corporation, Santa Clara, CA (US)

( * ) Notice: Subject to any disclaimer, the term of this patent is extended or adjusted under 35 U.S.C. 154(b) by 614 days.

(21) Appl. No.: 10/316,596

(22) Filed: Dec. 10, 2002

(65) Prior Publication Data
US 2004/0111714 A1   Jun. 10, 2004

(51) Int. Cl.
*G06F 9/45*      (2006.01)

(52) U.S. Cl. .............. 717/153; 717/154; 717/158; 717/159

(58) Field of Classification Search ......... 717/130–161
See application file for complete search history.

(56) References Cited

U.S. PATENT DOCUMENTS

| | | | |
|---|---|---|---|
| 6,292,935 B1 * | 9/2001 | Lueh et al. ............... | 717/148 |
| 6,314,562 B1 * | 11/2001 | Biggerstaff ............... | 717/156 |
| 6,463,582 B1 * | 10/2002 | Lethin et al. ............. | 717/158 |
| 2002/0062476 A1 * | 5/2002 | Saxe et al. ................ | 717/126 |
| 2002/0100031 A1 * | 7/2002 | Miranda et al. .......... | 717/152 |

OTHER PUBLICATIONS

Granlund et al., "Division by Invariant Integers Using Multiplication," SIGPLAN 94, Jun. 1994, pp. 61-72, ACM, Orlando, Florida, USA.

* cited by examiner

*Primary Examiner*—Tuan Dam
*Assistant Examiner*—Chuck Kendall
(74) *Attorney, Agent, or Firm*—Guojun Zhou

(57) ABSTRACT

An arrangement is provided for improving the performance of a dynamic compiler, specifically for dynamically optimizing integer division operations. When a compiler receives an integer division code at runtime, the compiler dynamically profiles a divisor of the division code. The integer division code is then optimized based on the characteristics of the divisor, which are determined at runtime.

34 Claims, 6 Drawing Sheets

DIVISOR CACHE 320

| 410<br>FLAG | 420<br>VALUE OF DIVISOR | 430<br>COUNTER OF DIVISOR | 440<br>OPTIMIZATION PARAMETER FOR DIVISOR |
|---|---|---|---|
| FLAG 1 | DIVISOR 1 | COUNT 1 | OPTIMIZATION PARAMETER 1 |
| FLAG 2 | DIVISOR 2 | COUNT 2 | OPTIMIZATION PARAMETER 2 |
| ⋮ | ⋮ | ⋮ | ⋮ |

Fig. 4

© 2002 INTEL CORPORATION 1   test divisor, divisor ;
2   je throw_divide_by_zero_exception ;
3   mov edi, divisor ;
4   and edi, 0x000007ff ; /*assume the length of the divisor hashtable is less than 0x800*/
5   cmp divisor, [edi+cache_offset] ;
6   jne divisor_profiling ;
7   push eip ;
8   jmp optimized_division_code ;
9   jmp succ ;
10  divisor_profiling:
11      mov eax, [edi+cache_offset+4] ;
12      cmp divisor, eax ;
13      je inc_divisor_count ;
14      test eax, eax ;
15      jne normal_division_code ;
16      lock cmpxchg [edi+cache_offset+4], divisor ;
17  inc_divisor_count:
18      inc [edi+cache_offset+8] ;
19      cmp [edi+cache_offset+8], TRIGGER_NUM ;
20      jl normal_division_code ;
21      push divisor ;
22      push edi ;
23      call PREPARE_OPTIMIZATION_PARAMETERS ;
24  normal_division_code:
25      idiv dividend, divisor ;
26  succ:
27

Example Optimized Division Code 610 optimized_division_code:
    mov ebp, divisor ;
    mov edx,[edi+cache_offset+12] ;
    imul edx ;
    add edx, ebp ;
    sar edx, [edi+cache_offset+16] ;
    mov eax, edx ;
    add edx, 0x80000000 ;
    adc eax, 0 ;
    pop ecx ;
    add ecx, 6 ;
    jmp ecx ;  /*jmp back to line9*/
              /*eax is the quotient*/

DYNAMIC DIVISION OPTIMIZATION FOR A JUST-IN-TIME COMPILER

RESERVATION OF COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present invention relates generally to compilers and, more specifically, to the performance improvement of a Just-In-Time compiler in a Java Virtual Machine by dynamically optimizing division operations.

2. Description

Currently, the Java programming language is more commonly used for building network-based software than other languages such as C and C++ because of its platform-independent characteristics. The use of a Java Virtual Machine (JVM) makes Java independent from different hardware and operating systems. JVM is an abstract computing machine implemented in software on top of a hardware platform and operating system. In order to use a JVM, a Java program must first be compiled into an architecture-neutral distribution format, called Java bytecode. JVM interprets the bytecode and executes the code on a specific computing platform. However, the interpretation by JVM typically imposes an unacceptable performance penalty to the execution of a bytecode because of large runtime overhead processing. A Just-In-Time (JIT) compiler has been designed to improve the JVM's performance. It compiles the bytecode of a given method into a native code of the underlying machine before the method is first called. The native code of the method is stored in memory and any later calls to the method will be handled by this faster native code, instead of by the JVM's interpretation.

Although the JIT compiler can usually speed up the execution of a Java program, optimization methods are needed for a JIT compiler to generate a more efficient native code for a Java bytecode. For example, one optimization method is to inline some simple methods to reduce the method invocation overhead. Another optimization method is to speed up integer division operations that are normally very expensive.

One method for speeding up integer division operations in processors in general is to implement them using integer multiplications, which are several times faster than corresponding divisions. However, it usually requires that the divisor have certain characteristics. For example, T. Granlund and P. Montgomery teach a method for speeding up an integer division with an invariant divisor by converting the division into a multiplication operation of the dividend and the reciprocal of the divisor in "Division by Invariant Integers using Multiplication", Proceedings of the 1994 Associates of Computing Machinery (ACM) Special Interest Group on Programming Languages (SIGPLAN) Conference on Programming Language Design and Implementation (Granlund hereinafter). This method requires that the divisor be a known constant at compilation time and thus results in a static optimization approach for divisions. In reality, however, divisors may not be known until runtime. Therefore, dynamic approaches are necessary to optimize integer divisions at runtime.

BRIEF DESCRIPTION OF THE DRAWINGS

The features and advantages of the present invention will become apparent from the following detailed description of the present invention in which:

FIG. 4 depicts a structure of a divisor cache used by a division optimization mechanism according to an embodiment of the present invention;

FIG. 6 is an exemplary pseudo-code of an implementation of a division optimization mechanism according to an embodiment of the present invention.

DETAILED DESCRIPTION

Figure 1:
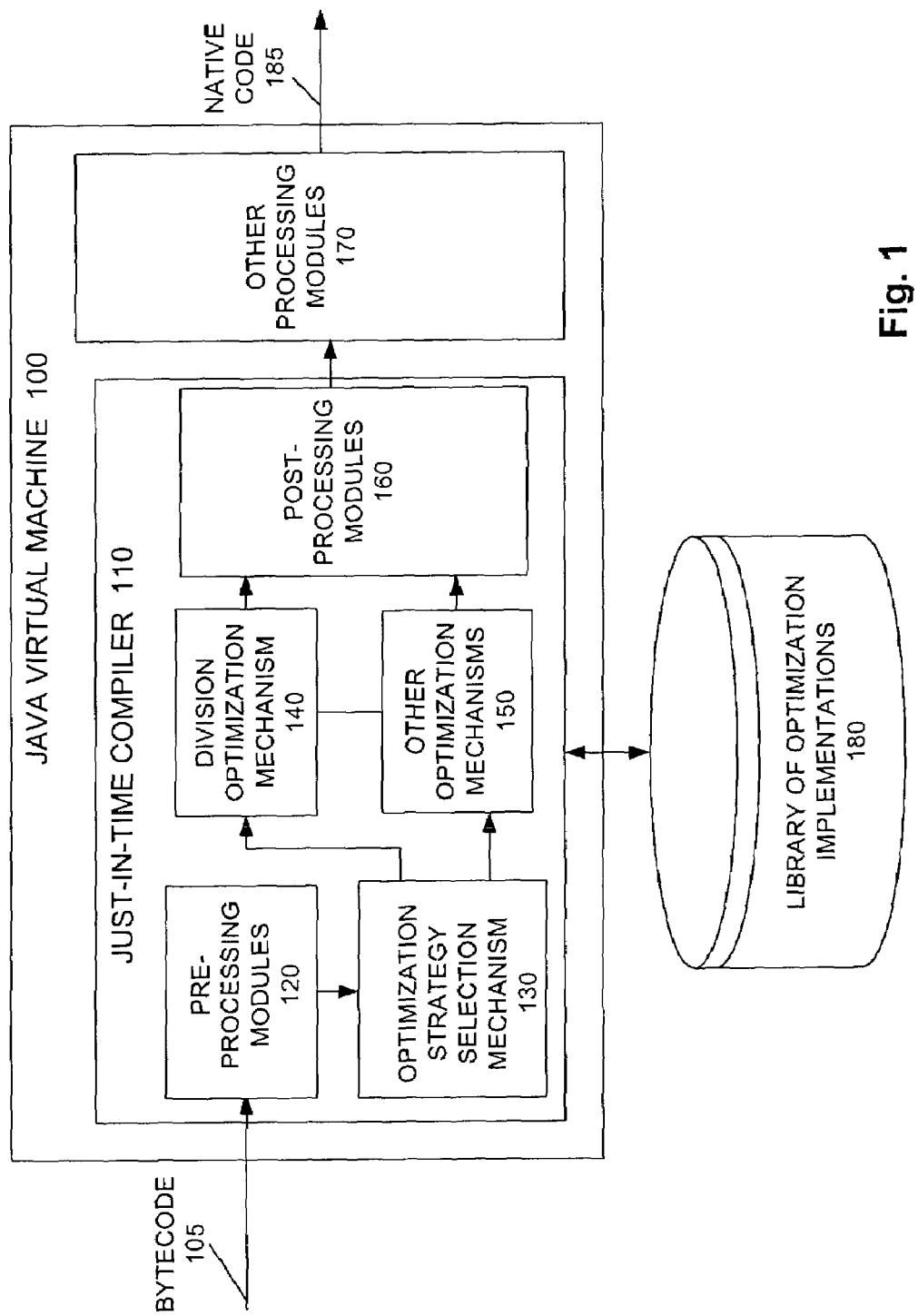
FIG. 1 depicts a high-level framework for a JVM that uses a JIT compiler with a division optimization mechanism, according to an embodiment of the present invention.

An embodiment of the present invention is a method and apparatus for optimizing integer division operations for a compiler such as a JIT compiler in a JVM. The present invention may be used to enhance the performance of a compiler to generate a more efficient native code for divisions by using a division optimization mechanism. In one embodiment, the division optimization mechanism may profile divisions based on their divisors at runtime. For those divisions whose divisors are relatively invariant at runtime, a faster division approach can be used for them. The faster division approach may be an implementation of a division operation by using the multiplication of the dividend and the reciprocal of the divisor, as taught in Granlund. The faster division approach may also be a hardware implementation of a division operation. To profile divisions based on their divisors, a divisor cache may be used to store the divisor value, the number of occurrences of a divisor, and other information about the divisor. If the occurrence of a divisor is frequent, it may be considered as invariant in the current application and its optimization parameters may be computed in order to invoke the faster implementation of the division operation. The optimization parameters may be the reciprocal of the divisor if Granlund's method is used, or a pointer to a hardware implementation. Once integrated with a compiler, the division optimization mechanism can improve the speed and efficiency of the compiled integer division code dynamically at runtime. For applications where divisors are constantly changing, this division optimization mechanism may be turned off by an optimization strategy selection mechanism. The optimization strategy selection mechanism may also select a different optimization approach (e.g., method inlining, or optimizations for a different operations), if the entire application will not be measurably benefited from the division optimizations.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

The Java programming language is independent from the computing platform, including hardware and operating systems. To achieve such independence, a Java program (also called a Java application) is first compiled by the Java compiler and is converted into what is known as "bytecodes". The bytecodes are placed into class (.class) files. The compiler generates one class file per class in the Java source code. This class file is then interpreted into instructions, which can be sent directly to the processor on any machine that has a JVM. The JVM is an abstract computing machine that has its own instructions. It is virtual because it is implemented in software. The JVM knows nothing about the Java programming language but bytecodes, which contain a sequence of JVM-understandable instructions. The JVM provides a layer of abstraction between Java bytecodes and the underlying computing platform. The JVM makes Java applications portable across different computing platforms because Java bytecodes run on the JVM, independent of whatever may be underneath a particular JVM implementation.

The JVM interprets each instruction in a bytecode and executes it, in a way similar to what other interpreted languages do, such as Basic, LISP, and Smalltalk. Interpretation, however, is usually very slow because one instruction in a bytecode may require many machine-specific instructions to interpret and execute it. To speed up the JVM processing time for a Java bytecode, a JIT compiler is introduced to the JVM. The JIT compiler compiles and creates a machine code representation (also called native code) of a Java bytecode at runtime. Because Java supports dynamic class loading, methods in bytecodes sometimes do not exist and thus cannot be statically compiled into native code until classes containing these methods are loaded at runtime. This is how the name of "Just-In-Time" comes from. Before a JIT-enabled JVM executes a method, the JIT compiler creates a native code of that method in memory, and any future calls to that method will be handled by the faster native code instead of by an interpreter. Since the JIT compilation itself is relatively slow, a JIT compiler may initially cause the bytecode to run more slowly than an interpreter would, but only when the bytecode is executed for the first time. Typically, methods in an application are called repeatedly, and a JIT compiler will usually cause the application to run much faster than it would when executed by a purely interpretive JVM. Although a JIT compiler now becomes an integral part of a JVM, it can be used optionally. In order to make the JIT-compiled native code faster and more efficient, a number of optimization methods are usually employed by the JIT compiler. The present invention is related to the dynamic optimization of integer division operations.

FIG. 1 depicts a high-level framework for a JVM that uses a JIT compiler with a division optimization mechanism, according to an embodiment of the present invention. When input Java bytecodes 105 come in, the JVM 100 passes the bytecodes to the JIT compiler 110. The JIT compiler first pre-processes the bytecodes through its pre-processing modules 120. In this step, the JIT compiler may perform a flow analysis during which the basic blocks and the loop structures are generated through a linear-time traversal of the bytecode sequence. After the flow analysis, the input bytecodes may be converted into an internal representation from which the optimization process may start.

The optimization strategy selection mechanism 130 has a component to determine the best optimization methods based on the bytecodes' internal representation. For example, if an integer division is present, the optimization strategy selection mechanism passes the code to the division optimization mechanism 140. It is well known that a division operation requires more machine cycles and is hence more expensive than other basic operations such as addition and multiplication. According to one embodiment of the present invention, the division optimization mechanism may dynamically optimize integer divisions based on the divisors, using other less expensive operations or other optimization implementations such as hardware optimization. These optimization implementations or their pointers can be stored in the library of optimization implementations 180. A selection component in the division optimization mechanism may select the best optimization implementation available in the library based on the code to be optimized.

If other codes or structures are present in the internal representation that have available optimization methods, the relevant component in the optimization strategy selection mechanism determines the best optimization strategy and passes these codes or structures to the corresponding optimization mechanisms. Block 150 in FIG. 1 includes all optimization mechanisms other than the division optimization mechanism. The other optimization mechanisms 150 may include method inlining, which replaces calls to simple methods with the copies of their bodies to avoid method invocation overheads. The other optimization mechanisms 150 may also include the exception check elimination, which eliminates the exception check to avoid the check overhead if it can be proved via previous steps that an exception cannot occur. There are other possible optimization methods that may be used to improve the performance of the JIT compiler. The implementations of optimization methods may be stored in the library of optimizations 180. The selection component in each optimization mechanism may select the best implementation from the library. According to embodiments of the present invention, interactions may exist between division optimization mechanism 140 and other optimization mechanisms 150 so that some codes can benefit from all available optimization methods.

After optimizing all possible parts of the internal presentation, the post-processing modules 160 process the individually optimized codes so that a JVM acceptable sequence of codes can be passed to the JVM. The post-processing may include the code scheduling, which reorders individually optimized codes to best fit the requirements imposed by the architectural characteristics of the underlying machine. Other processing modules 170 may be required by the JVM to process the JIT-compiled code before a final native code is generated.

Figure 2:
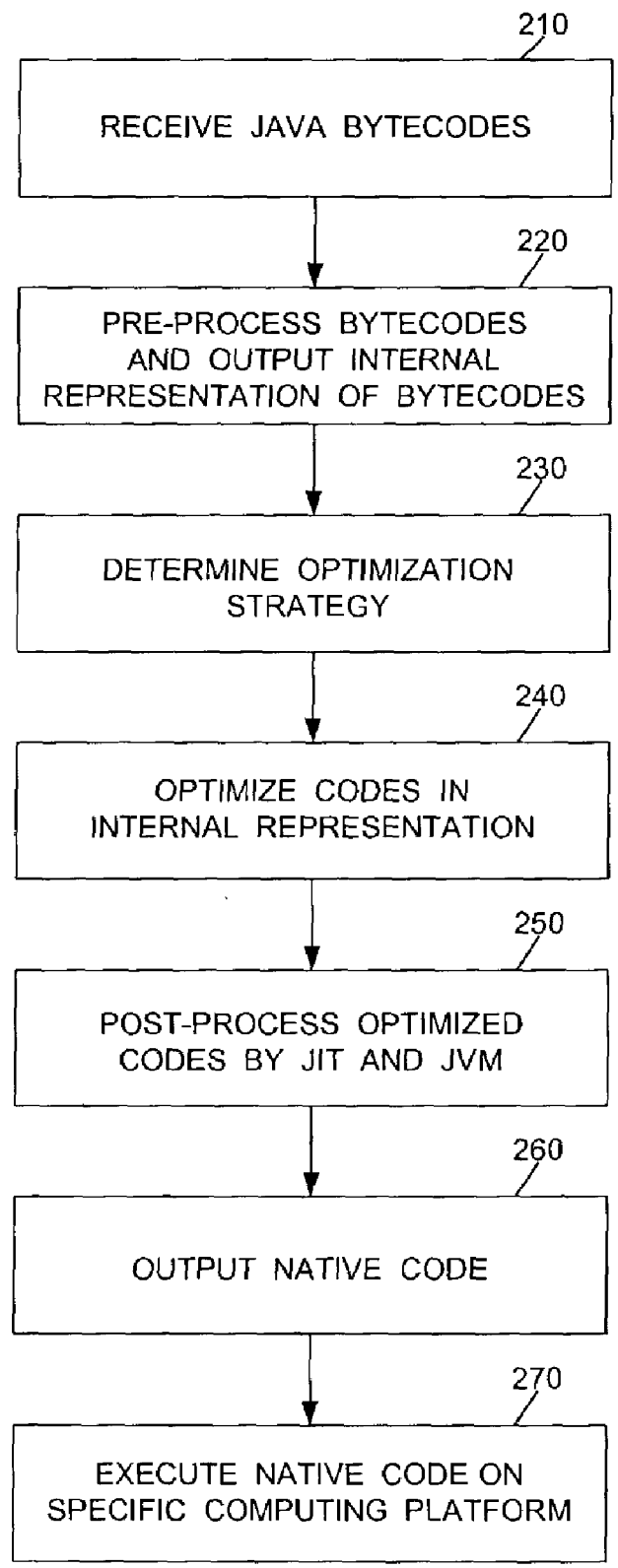
FIG. 2 is an exemplary flow diagram of a process in which a native code with various optimizations, including integer division optimization, is generated for a Java bytecode by a JIT compiler, according to an embodiment of the present invention.

FIG. 2 is an exemplary flow diagram of a process in which a native code with various optimizations, including integer division optimization, is generated for a Java bytecode by a JIT compiler, according to an embodiment of the present invention. At block 210, Java bytecodes (usually in class files) may be received by the JVM and passed to the JIT compiler. At block 220, the received Java bytecodes may be pre-processed and converted into an internal representation by the JIT compiler. At block 230, a best optimization strategy may be dynamically determined based on the bytecodes' internal representation. At block 240, actual optimizations (e.g., method inlining, dynamic optimization for integer divisions, etc.) according to the determined optimization strategy at block 230 may be performed based on the bytecodes' internal representation. An optimization process may include converting a bytecode into a set of instructions native to an underlying computing architecture, selecting a best optimization implementation, and optimizing the set of the native instructions. At block 250, post-optimization processes such as code scheduling may be performed for the optimized codes from block 240. At block 260, a native code, which may be executed directly in the processor of the underlying platform, may be generated and outputted. At block 270, the Java application in the form of the native code may be executed on a specific computing platform (comprising hardware architecture and operating systems) on which the JVM resides.

Figure 3:
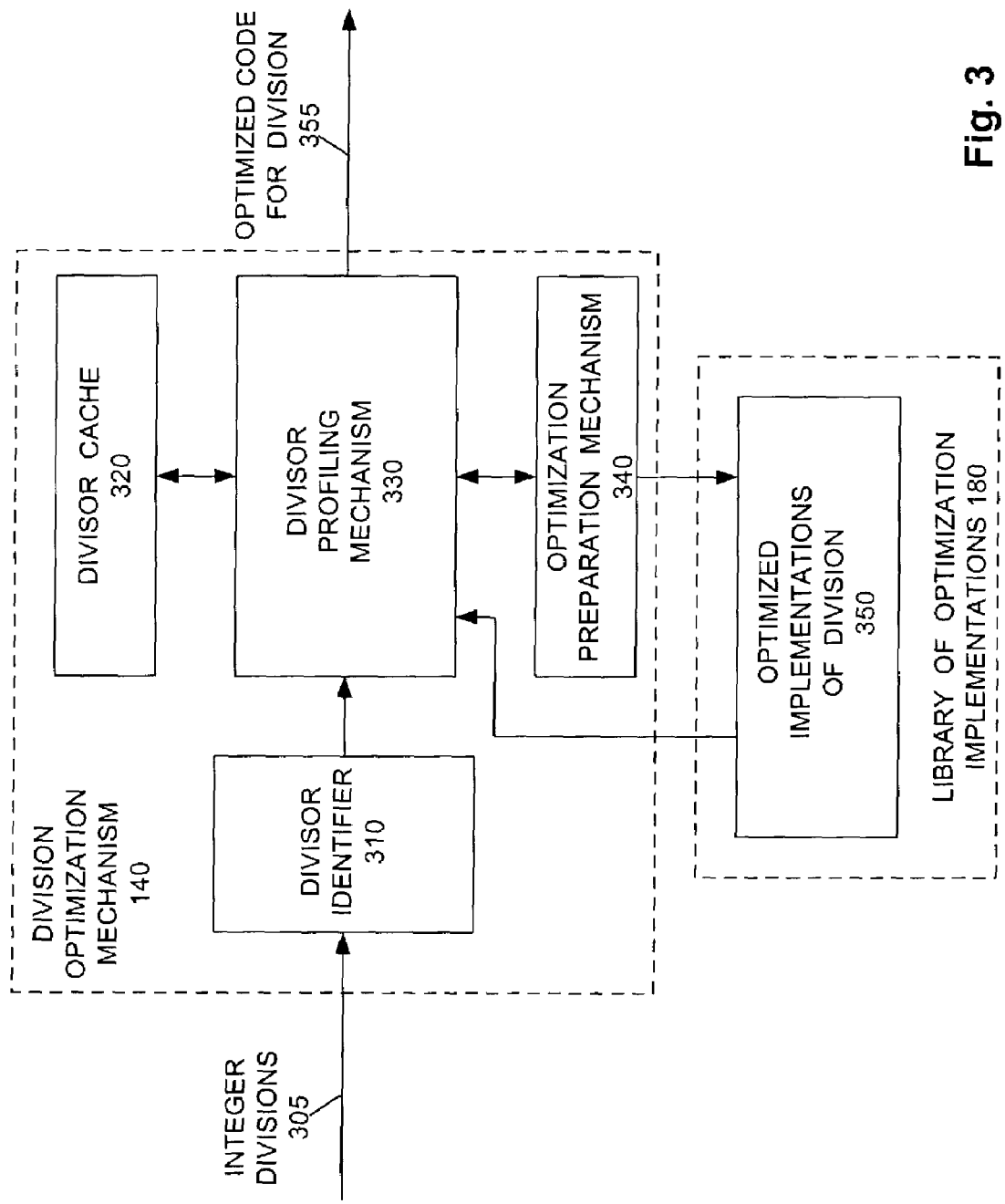
FIG. 3 is a high-level functional block diagram of a division optimization mechanism according to an embodiment of the present invention.

FIG. 3 is a high-level functional block diagram of a division optimization mechanism according to an embodiment of the present invention. Integer divisions 305 in an internal representation of a bytecode, determined by the optimization strategy selection mechanism 130 in the JIT compiler 110, are passed to the division optimization mechanism 140. The division optimization mechanism may comprise a divisor identifier 310, a divisor cache 320, a divisor profiling mechanism 330, and an optimization preparation mechanism 340. Calls to the optimization implementations of divisions 350 inside the library of optimization implementations 180 may be needed for the division optimization mechanism to generate an optimized code for divisions 355.

The divisor identifier 310 may comprise several functional components: a detection component, an exception processing component, and search component. The detection component detects a zero-valued divisor. The exception processing component throws an arithmetic exception if a divisor is zero. The search component searches for an input divisor in the divisor cache 320 to determine if the divisor can be found in the divisor cache if the divisor is not zero. If an input divisor can be found in the divisor cache, the occurrence of this divisor is considered frequent and its value is invariant in the application. Therefore, any upcoming divisions with such divisor can be optimized with the optimization parameters already prepared and previously stored in the divisor cache. For purpose of this application, an "invariant" divisor means that the number of occurrences of a divisor is larger than a preset trigger number, which may be determined by experiments and may be variable from one application to another. One optimization implementation for the divisions with an invariant divisor is to multiply the dividend by the reciprocal of the divisor because a multiplication is much cheaper than a division. In this implementation, the optimization parameter is the reciprocal of the invariant divisor. Another optimization implementation may be hardware based. If the invariant divisor satisfies certain criteria (e.g., power of 2), hardware circuits may be used to achieve the division. The optimization parameter in this implementation may be a pointer to the hardware implementation.

The structure of the divisor cache 320 is shown in FIG. 4. According to the present invention, one embodiment of this structure may be an implementation using a hash table. Other embodiments of the divisor cache are within the scope of the present invention. The hash table may comprise at least one entry or a row, for each divisor. An entry may comprise four fields, i.e., flag 410, value of divisor 420, counter of divisor 430, and optimization parameters of divisor 440. When an entry is first created, the flag field and optimization parameter field of the entry may be initialized with any random number (e.g., zero). The divisor value field of an entry stores the value of a divisor. The counter field of an entry records the number of occurrences of a divisor. When the counter of a divisor becomes equal to the preset trigger number, the divisor becomes invariant for the first time during runtime. The optimization parameters are thus prepared for this divisor and stored in the optimization parameter field of this divisor in the divisor cache. Subsequently the value in the flag field 410 of the divisor is replaced with the value of the divisor. Any upcoming divisions with this divisor can, therefore, be optimized using the prepared optimization parameters.

When a new divisor is received, the divisor profiling mechanism first compares the value of the divisor with the flag of each entry in the divisor cache. If the value of the divisor matches the value in a flag field in the divisor cache, it means that this divisor can be found in the divisor cache and the divisor is invariant. A division with the invariant divisor is ready to be optimized using the optimization parameters previously stored in the divisor cache. The corresponding components in the divisor profiling mechanism will further select a best optimization implementation for this division, pass the required optimization parameters to the selected implementation, and invoke the selected implementation. A normal division code (non-optimized division) is employed whenever no flags are found to match the divisor value.

If no flags in the divisor cache match the value of the incoming divisor, the divisor is further compared with the divisor value field 420 in the divisor cache. If any match is found, a counting component in the divisor profiling mechanism may increment the value of the counter field 430 of the matched divisor in the divisor cache by 1. If no match is found, a creation component in the divisor profiling mechanism may create an entry for this divisor in the divisor cache. An initialization component in the divisor profiling mechanism may initialize the flag and optimization parameter fields of the new entry with a random number, and set the counter field with one.

A component in the divisor profiling mechanism determines whether an incoming divisor becomes invariant for the first time during runtime by comparing the value of the counter field of the divisor in the divisor cache with the trigger number. When the value of the counter field of the divisor is equal to the trigger number, the divisor becomes invariant for the first time during runtime. A component in the divisor profiling mechanism selects a best optimization implementation for the incoming division code based on the characteristics of the divisor. Another component in the divisor profiling mechanism sends a request along with necessary parameters such as the divisor value to the optimization parameter preparation mechanism 340 for preparing the optimization parameters for this divisor. After the optimization parameters are prepared, they are passed back to the divisor profiling mechanism where a component stores the prepared optimization parameters in the divisor cache and replaces the corresponding flag field with the divisor value.

The optimization preparation mechanism 340 has two major components. One component prepares optimization parameters required by the selected optimization implementation by the divisor profiling mechanism. When the optimization parameters are prepared, the other component passes the optimization parameters to the divisor profiling mechanism to update the divisor cache, and to the selected optimization implementation to invoke it.

There may be at least two purposes to having a flag field in addition to the divisor value field for an entry in a divisor cache. The first is to prevent the optimization parameters from being used in a multi-threading computing environment before they are actually ready. Preparing the optimization parameters may take some time. Having a flag field in the divisor cache and replacing it with the divisor value only after the optimization parameters are prepared ensures that other threads will not accidentally use the premature optimization parameters. Without the flag field, it is hard to achieve this purpose. The other purpose to having a flag field is to speed up the comparing process because any incoming divisor only needs to be compared with flags to determine if optimizations are available for the divisor. In addition, maintaining a flag field takes little time because the flag field is initialized with any random value (e.g., zero) and is replaced only once thereafter.

Figure 5:
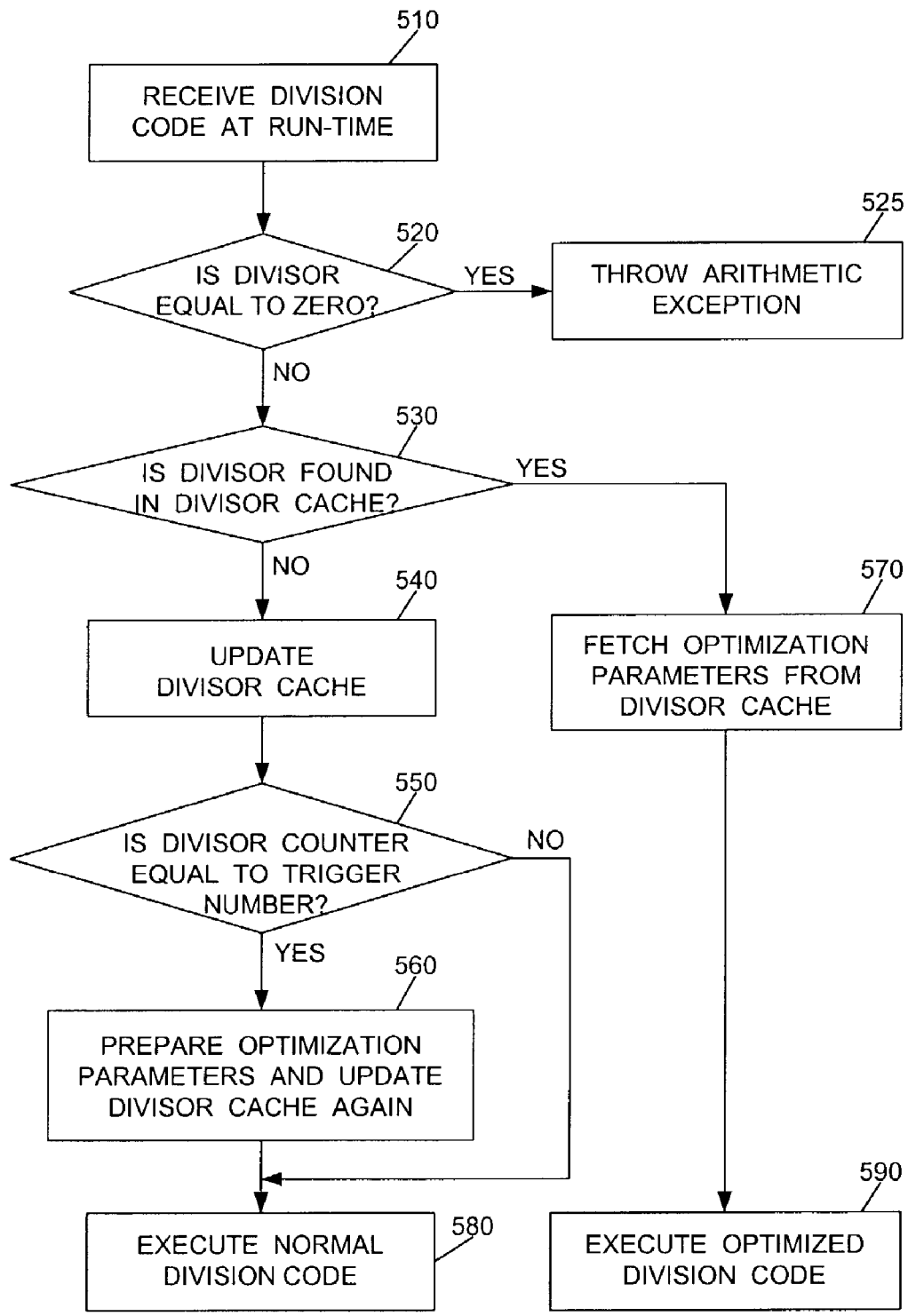
FIG. 5 is an exemplary flow diagram of a process in which a division optimization mechanism dynamically profiles divisors of divisions and deploys fast division codes at runtime, according to an embodiment of the present invention.

FIG. 5 is an exemplary flow diagram of a process in which a division optimization mechanism dynamically profiles divisors of divisions and deploys fast division codes at runtime, according to an embodiment of the present invention. At block 510, an integer division code may be received at runtime. At block 520, the divisor of the division may be identified. If the divisor is equal to zero, an arithmetic exception may be thrown at block 525. If the divisor is not equal to zero, the divisor may be further searched for to determine if the divisor can be found in the divisor cache at block 530. A divisor being found in the divisor cache means that the divisor's value matches one flag in the divisor cache. If the search result from block 530 is yes, this means that this divisor is invariant during runtime and the divisor's optimization parameters have already been prepared and previously saved in the divisor cache. A best optimization implementation may subsequently be selected. At block 570, the corresponding optimization parameters may be fetched from the divisor cache and passed to the selected optimized division code, which may be executed at block 590. The optimization parameters may be passed using pointers to their locations in the divisor cache.

If the divisor is not found in the divisor cache at block 530 in FIG. 5, the divisor cache needs to be updated at block 540. If no match in the divisor value field is found for the divisor in the divisor cache, this is the first appearance of this divisor. A new entry in the divisor cache is thus created for this divisor and the divisor counter field is set to one. On the other hand, if there is a match in the divisor value field for the input divisor, the counter field corresponding to that matched divisor is incremented by one. At block 550, the counter of the input divisor is checked to determine if it is equal to the preset trigger number. If the answer is yes, this means that the divisor becomes invariant for the first time during runtime and optimization parameters may be requested to be prepared for the divisor. At block 560, the optimization parameters of the input divisor may be prepared, and the divisor cache may subsequently be updated. When updating the divisor cache this time, the prepared optimization parameters may be stored in their designated field and the flag may be replaced with the divisor value in the divisor cache. If the answer at block 550 is no, the divisor is not invariant yet and the normal division code may be invoked for the division. At block 580, the normal division code may be employed and executed.

FIG. 6 is an exemplary pseudo-code of an implementation of a division optimization mechanism according to an embodiment of the present invention. The code example comprises several parts: lines 1–2 identifying a zero-valued divisor and throwing a divide-by-zero exception, lines 3–6 checking if an incoming divisor is invariant, lines 7–9 invoking the optimized division code, lines 10–20 profiling the divisor, lines 21–23 preparing optimization parameters, and lines 24–25 invoking a normal division code. Block 610 shows an exemplary code optimizing a division by using a multiplication of the dividend and the reciprocal of the divisor. Here the optimization parameter is the reciprocal of the divisor. Instead of passing the value of the divisor's reciprocal, the address where the reciprocal is stored in the divisor cache may be passed to the optimized division code.

First, the input divisor is checked to determine if its value is zero at line 1. If the answer is yes, an arithmetic exception (divide-by-zero) may be thrown (line 2). Second, lines 3–6 checks if the input divisor is invariant. If the divisor is invariant, the required optimization parameters may be stored at [eax+cache+offset]. This exemplary pseudo code uses a hash table for the divisor cache. Line 4 shows how to access the corresponding slot in the hash table. A cache slot in the hash table corresponds to an entry (a row) in the divisor cache as shown in FIG. 4. The hash table should be large enough to reduce the probability that more than one divisor is hashed to a same slot. Technologies developed to avoid collisions in a hash table may also be employed here. Line 5 checks if the divisor value is the same as that in the flag field of this cache slot. If the two values are equal, the divisor is invariant and the division with this divisor may be ready to be optimized because the required optimization parameters have already been prepared and stored in the divisor cache.

Lines 10–20 in the pseudo code profiles divisors at runtime. If the input divisor is equal to the value in the divisor value field of the cache slot, the counter in this slot is incremented by one (line 18). Otherwise, a hashing collision happens, that is, the input divisor is hashed to a slot that has already been occupied by another divisor. There are several ways to deal with this problem. One simple way is to give up optimization for this divisor and employ a normal division code as shown in lines 14–15. Other approaches to solving this collision problem are to rehash the input divisor to a different slot, which may increase the profiling overhead. Line 19 compares the counter value in the cache slot with a preset trigger number, $TRIGGER_{13}$ NUM. If they become the same, the method for preparing optimization parameters is invoked (line 23). This method also updates the flag field with the divisor value before it returns. In all other cases, the normal division code is employed, that is, the input division is not optimized.

To show the benefits of the present invention, the JIT compiler is used to describe the invention. In fact, the invention is not intended to be limited to improve the performance of the JIT compiler in the JVM. The invention can be used in other compilers to optimize division operations and thus to improve the their performance.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features, components, or modules were omitted, simplified, combined, or split in order not to obscure the present invention.

Embodiments of the present invention may be implemented on any computing platform, which comprise hardware and operating systems.

If embodiments of the present invention are implemented in software, the software may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for improving the performance of a dynamic compiler, comprising:
   receiving a first code;
   determining a strategy for optimizing a segment of the first code, wherein determining the strategy includes dynamically determining a best strategy available to the compiler to optimize the segment according to characteristics of the segment;
   optimizing the segment of the first code using the determined optimization strategy, wherein optimizing the segment includes dynamically optimizing integer division operations; and
   outputting a second code, the second code representing the optimized first code.

2. The method of claim 1, wherein the first code represents a computer programming code in a high-level programming language.

3. The method of claim 1, wherein optimizing the segment of the first code comprises converting the segment in a high-level language to a set of lower-level computing instructions native to an underlying computing architecture, selecting a best optimization implementation, and optimizing the set of lower-level computing instructions based on the determined optimization strategy.

4. The method of claim 1, wherein the second code comprises the optimized first code in lower-level computing instructions native to the underlying computing architecture.

5. An article comprising a machine accessible medium having content stored thereon, wherein when the content is accessed by a processor, the content provides for improving the performance of a dynamic compiler by:
   receiving a first code;
   determining a strategy for optimizing a segment of the first code, wherein determining the strategy includes dynamically determining a best strategy available to the compiler to optimize the segment according to characteristics of the segment;
   optimizing the segment of the first code using the determined optimization strategy, wherein optimizing the segment includes dynamically optimizing integer division operations; and
   outputting a second code, the second code representing the optimized first code.

6. The article of claim 5, wherein the first code represents a computer programming code in a high-level programming language.

7. The article of claim 5, wherein content for optimizing the segment of the first code comprises content for converting the segment in a high-level language to a set of lower-level computing instructions native to an underlying computing architecture, selecting a best optimization implementation, and optimizing the set of lower-level computing instructions based on the determined optimization strategy.

8. The article of claim 5, wherein the second code comprises the optimized first code in lower-level computing instructions native to the underlying computing architecture.

9. A compiling system, comprising:
   at least one pre-processing module to receive a first code in a high-level computer programming language;
   an optimization strategy selection mechanism to determine a strategy for optimizing a segment of the first code, the optimization strategy selection mechanism including a component to dynamically determine a best strategy available to the compiler to optimize the segment according to characteristics of the segment;
   at least one optimization mechanism to optimize the segment of the first code using the determined optimization strategy, the optimization mechanism including a division optimization mechanism to dynamically optimize integer division operations;
   a library to provide optimization implementations; and
   at least one post-processing module to generate a second code based on optimized segments of the first code and optimization implementations in the library.

10. The compiling system of claim 9, wherein the optimization mechanism comprises a selection component to select an optimization implementation for the segment of the first code based on the determined optimization strategy.

11. The compiling system of claim 9, wherein the post-processing module processes optimized segments of the first code to generate a second code in lower-level computing instructions native to an underlying computing architecture.

12. A method for dynamically optimizing integer division operations, comprising:
   receiving a division code at runtime;
   identifying a divisor of the division code;
   updating information describing the divisor in a divisor cache, if the divisor is not invariant;
   preparing optimization parameters for the divisor, if the divisor becomes invariant for the first time during runtime; and
   invoking a division implementation for an invariant divisor using the optimization parameters.

13. The method of claim 12, wherein identifying the divisor comprises:
   identifying a zero-valued divisor;
   throwing an arithmetic exception if the divisor is zero; and
   searching the divisor cache for the divisor if the divisor is not zero.

14. The method of claim 13, wherein searching the divisor cache for the divisor comprises identifying an invariant divisor whose optimization parameters have already been prepared and were previously stored in the divisor cache.

15. The method of claim 14, wherein identifying an invariant divisor comprises comparing the divisor with a value of a flag field in the divisor cache.

16. The method of claim 12, wherein updating information describing the divisor in the divisor cache comprises:
creating a new entry in the divisor cache and initializing at least a flag field and an optimization parameter field of the entry, if the divisor appears for the first time;
incrementing the number of occurrences of the divisor of the entry;
determining that the divisor becomes invariant for the first time during runtime, if the number of occurrences of the divisor becomes equal to a pre-set trigger number; and
requesting preparation of optimization parameters for the divisor which becomes invariant for the first time during runtime.

17. The method of claim 16, wherein preparing optimization parameters for the divisor comprises:
preparing optimization parameters required by available optimization implementations;
storing the prepared optimization parameters in the divisor cache; and
updating the flag field in the divisor cache after optimization parameters of the divisor are stored in the divisor cache.

18. The method of claim 12, wherein invoking a division implementation comprises:
invoking a normal division code if the divisor is not invariant at runtime; and
selecting a best optimization implementation, passing optimization parameters to the selected implementation, and invoking the optimized implementation, if the divisor is invariant at runtime.

19. An article comprising: a machine accessible medium having content stored thereon, wherein when the content is accessed by a processor, the content provides for dynamically optimizing integer division operations by:
receiving a division code at runtime;
identifying a divisor of the division code;
updating information describing the divisor in a divisor cache, if the divisor is not invariant;
preparing optimization parameters for the divisor, if the divisor becomes invariant for the first time during runtime; and
invoking a division implementation for an invariant divisor using the optimization parameters.

20. The article of claim 19, wherein content for identifying the divisor comprises content for:
identifying a zero-valued divisor;
throwing an arithmetic exception if the divisor is zero; and
searching the divisor cache for the divisor if the divisor is not zero.

21. The article of claim 20, wherein content for searching the divisor cache for the divisor comprises content for identifying an invariant divisor whose optimization parameters have already been prepared and were previously stored in the divisor cache.

22. The article of claim 21, wherein content for identifying an invariant divisor comprises content for comparing the divisor with a value of a flag field in the divisor cache.

23. The article of claim 19, wherein content for updating information describing the divisor in the divisor cache comprises content for:
creating a new entry in the divisor cache and initializing at least a flag field and an optimization parameter field of the entry, if the divisor appears for the first time;
incrementing the number of occurrences of the divisor in the entry;
determining that the divisor becomes invariant for the first time during runtime, if the number of occurrences of the divisor becomes equal to a pre-set trigger number; and
requesting preparation of optimization parameters for the divisor which becomes invariant for the first time during runtime.

24. The article of claim 23, wherein content for preparing optimization parameters for the divisor comprises content for:
preparing optimization parameters required by available optimization implementations;
storing the prepared optimization parameters in the divisor cache; and
updating the flag field in the divisor cache after optimization parameters of the divisor are stored in the divisor cache.

25. The article of claim 19, wherein content for invoking a division implementation comprises content for:
invoking a normal division code if the divisor is not invariant at runtime; and
selecting a best optimization implementation, passing optimization parameters to the selected implementation, and invoking the optimized implementation, if the divisor is invariant at runtime.

26. A system for dynamically optimizing integer divisions, comprising:
a divisor identifier to receive a division code at runtime and to identify a divisor of the division code;
a divisor cache to store information describing divisors;
a divisor profiling mechanism to profile divisors at runtime and to update the divisor cache; and
an optimization preparation mechanism to prepare optimization parameters if the divisor becomes invariant for the first time during runtime.

27. The system of claim 26, wherein the divisor identifier further comprises a detection component to detect a zero-valued divisor and an exception processing component to throw an arithmetic exception if a divisor is zero.

28. The system of claim 27, wherein the divisor identifier further comprises a search component to search for the divisor in the divisor cache to determine whether the divisor is invariant by comparing the divisor with the value in a flag field in the divisor cache, if the divisor is not zero.

29. The system of claim 26, wherein the divisor cache comprises at least one entry for storing information describing a divisor.

30. The system of claim 29, wherein the entry for a divisor in the divisor cache further comprises:
a flag field to store information indicating whether the divisor is found invariant during runtime;
a divisor value field to store the value of the divisor;
a divisor counter field to store the number of occurrences of the divisor at runtime; and
a divisor optimization parameter field to store optimization parameters if the divisor is found invariant during runtime.

31. The system of claim 26, wherein the divisor profiling mechanism comprises:
a creation component to create a new entry in a divisor cache, if a divisor appears for the first time;
an initialization component to initialize at least a flag field and an optimization parameter field of the newly created entry for the divisor in the divisor cache; and a counting component to increment the number of occurrences of the divisor and record the new number in the divisor counter field of the entry for the divisor in the divisor cache.

32. The system of claim 31, wherein the divisor profiling mechanism further comprises:
   a component to determine whether a divisor becomes invariant for the first time during runtime by comparing the number of occurrences of the divisor with a pre-set trigger number;
   a component to select a best optimization implementation for a division code with the divisor; and
   a component to send requests to the optimization preparation mechanism to prepare optimization parameters for the divisor, if the divisor becomes o invariant for the first time during runtime.

33. The system of claim 32, wherein the divisor profiling mechanism further comprises a component to store the prepared optimization parameters in the divisor cache for the divisor, and to replace the value of the divisor's flag field with the divisor in the divisor cache.

34. The system of claim 26, wherein the optimization preparation mechanism comprises:
   a component to prepare optimization parameters required by the selected optimization implementation;
   a component to pass optimization parameters to the divisor profiling mechanism to update the divisor cache, and to the selected optimization implementation to invoke the selected optimization implementation.

* * * * *